United States Patent
Khazaai et al.

(10) Patent No.: US 10,788,355 B2
(45) Date of Patent: Sep. 29, 2020

(54) DETECTING FLUID LEVEL VIA A FLOAT

(71) Applicant: Bourns, Inc., Riverside, CA (US)

(72) Inventors: Jay Jamshid Khazaai, Commerce, MI (US); James Gregory Stanley, Novi, MI (US); Don Blandino, Sterling Heights, MI (US); Kenneth R. Turner, Waterford, MI (US); Eoin Paul O'Regan, Douglas (IE)

(73) Assignee: Bourns, Inc., Riverside, CA (US)

( * ) Notice: Subject to any disclaimer, the term of this patent is extended or adjusted under 35 U.S.C. 154(b) by 19 days.

(21) Appl. No.: 15/778,083

(22) PCT Filed: Nov. 30, 2016

(86) PCT No.: PCT/US2016/064202
§ 371 (c)(1),
(2) Date: May 22, 2018

(87) PCT Pub. No.: WO2017/095913
PCT Pub. Date: Jun. 8, 2017

(65) Prior Publication Data
US 2018/0356273 A1    Dec. 13, 2018

Related U.S. Application Data (60) Provisional application No. 62/318,620, filed on Apr. 5, 2016, provisional application No. 62/260,928, filed on Nov. 30, 2015.

(51) Int. Cl.
*G01F 23/62* (2006.01)
*G01F 25/00* (2006.01)
(Continued)

(52) U.S. Cl.
CPC ............. *G01F 23/62* (2013.01); *F01N 11/00* (2013.01); *G01D 21/02* (2013.01); *G01F 23/72* (2013.01);
(Continued)

(58) Field of Classification Search
CPC . G01F 23/72; G01F 23/62; G01F 9/10; G01F 9/18; G01N 9/10; G01N 9/18
See application file for complete search history.

(56) References Cited

U.S. PATENT DOCUMENTS

| 3,754,446 A | 8/1973 | O'Connor |
| 3,964,317 A | 6/1976 | Blanchard |

(Continued)

FOREIGN PATENT DOCUMENTS

| CN | 101025358 A | 8/2007 |
| CN | 101142464 A | 3/2008 |

(Continued)

OTHER PUBLICATIONS

International Preliminary Report on Patentability for Application No. PCT/US2016/064202 dated Jun. 14, 2018 (10 pages).

(Continued)

*Primary Examiner* — Paul M. West
(74) *Attorney, Agent, or Firm* — Michael Best & Friedrich LLP (57) ABSTRACT

A fluid sensor including a guide, a float, a permanent magnet, and a magnetic angle sensor. In one example, the float is constrained at least in part by the guide to move along a vertical axis. The permanent magnet is mechanically coupled to the float. The magnetic angle sensor is configured to measure an angle of a magnetic field generated by the permanent magnet and is positioned such that movement of
(Continued)

the float along the vertical axis varies the angle of the magnetic field generated by the permanent magnet through the magnetic angle sensor.

18 Claims, 9 Drawing Sheets

(51) Int. Cl.
  *G01N 9/18* (2006.01)
  *G01D 21/02* (2006.01)
  *G01F 23/72* (2006.01)
  *G01N 9/10* (2006.01)
  *F01N 11/00* (2006.01)

(52) U.S. Cl.
  CPC ........... *G01F 25/0061* (2013.01); *G01N 9/10* (2013.01); *G01N 9/18* (2013.01); *F01N 2560/00* (2013.01); *F01N 2610/02* (2013.01); *F01N 2900/1814* (2013.01)

(56) References Cited

U.S. PATENT DOCUMENTS

| | | | |
|---|---|---|---|
| 4,371,837 A * | 2/1983 | Sieverin | G01R 33/07 324/225 |
| 4,400,978 A | 8/1983 | Guay et al. | |
| 4,920,797 A | 5/1990 | Swartz et al. | |
| 5,253,522 A | 10/1993 | Nyce et al. | |
| 5,471,873 A | 12/1995 | Nyce et al. | |
| 5,815,091 A | 9/1998 | Dames et al. | |
| 5,830,375 A | 11/1998 | Huang et al. | |
| 5,900,547 A | 5/1999 | Bartkiewicz | |
| 6,218,949 B1 | 4/2001 | Issachar | |
| 6,418,788 B2 | 7/2002 | Articolo | |
| 8,978,464 B2 | 3/2015 | Prinstil | |
| 10,379,023 B2 | 8/2019 | Garrido Garza et al. | |
| 2001/0029782 A1 | 10/2001 | Articolo | |
| 2002/0005715 A1 | 1/2002 | Sato | |
| 2006/0248952 A1 | 11/2006 | Jarvie | |
| 2006/0266113 A1 | 11/2006 | Hart | |
| 2008/0223130 A1 | 9/2008 | Snell et al. | |
| 2009/0064777 A1 | 3/2009 | Mundo | |
| 2011/0078692 A1 | 3/2011 | Nickolls et al. | |
| 2011/0187529 A1 | 8/2011 | Maurer et al. | |
| 2012/0255353 A1 * | 10/2012 | Kozaki | G01F 25/0061 73/305 |
| 2013/0000741 A1 | 1/2013 | Crary | |
| 2013/0037138 A1 | 2/2013 | Georis | |
| 2013/0167622 A1 | 7/2013 | Frivik | |
| 2014/0157992 A1 | 6/2014 | Farotto | |
| 2015/0013646 A1 | 1/2015 | Qi | |
| 2016/0123789 A1 | 5/2016 | Deak et al. | |
| 2017/0010147 A1 | 1/2017 | Deak et al. | |
| 2018/0073910 A1 | 3/2018 | Deak et al. | |

FOREIGN PATENT DOCUMENTS

| | | | | |
|---|---|---|---|---|
| EP | 1072872 A2 * | 1/2001 | ............. | G01F 23/38 |
| GB | 2270758 A | 3/1994 | | |
| JP | S55141050 U | 10/1980 | | |
| JP | H08136208 A | 5/1996 | | |
| JP | H11287696 A | 10/1999 | | |
| JP | 2009236615 A | 10/2009 | | |
| WO | 2017095906 A1 | 6/2017 | | |

OTHER PUBLICATIONS

International Preliminary Report on Patentability for Application No. PCT/US2016/064191 dated Jun. 14, 2018 (15 pages).
BITRON, "Automotive Products,"<http://www.bitron.net/index.php?option=com_content&view=article&id=370&Itemid=37> webpage available at least as early as Sep. 17, 2015.
International Search Report and Written Opinion for Application No. PCT/US2016/064191 dated Mar. 29, 2017 (16 pages).
International Search Report and Written Opinion for Application No. PCT/US2016/064202 dated Mar. 17, 2017 (11 pages).
Chinese Patent Office Action for Application No. 201680068496.3 dated May 29, 2019 (21 pages, English translation included).
European Patent Office Partial Supplementary Search Report for Application No. 16871411.1 dated Sep. 24, 2019 (10 pages).
Chinese Patent Office Action for Application No. 201680069513.5 dated Mar. 18, 2020 (24 pages, English translation included).
European Patent Office Extended Search Report for Application No. 16871411.1 dated Feb. 27, 2020 (11 pages).
European Patent Office Extended Search Report for Application No. 16871415.2 dated Feb. 6, 2020 (6 pages).
Japanese Patent Office Action for Application No. 2018-527892 dated Mar. 11, 2020 (14 pages, English translation included).
United States Patent Office Action for U.S. Appl. No. 15/778,079 dated Feb. 27, 2020 (11 pages).
Japanese Patent Office Action for Application No. 2018-527980 dated Jun. 10, 2020 (13 pages), English translation Included).
United States Patent Office Action for U.S. Appl. No. 15/778,079 dated Jun. 9, 2020 (14 pages).

* cited by examiner

DETECTING FLUID LEVEL VIA A FLOAT

RELATED APPLICATIONS

This application claims the benefit of U.S. Provisional Patent Application No. 62/260,928, filed on Nov. 30, 2015, and U.S. Provisional Patent Application No. 62/318,620, filed on Apr. 5, 2016, the entire contents of which are incorporated herein by reference.

TECHNICAL FIELD

Embodiments relate to sensing a level of a fluid.

SUMMARY

Fluid level sensing is useful in a number of vehicle applications including, for example, sensing the level of Diesel Exhaust Fluid (DEF) within a vehicle tank of a vehicle, to be used in a selective catalytic reduction diesel emission-control system. Selective catalytic reduction (SCR) is a method of converting diesel oxides of nitrogen (NOx) emissions, by catalytic reaction, into diatomic benign nitrogen gas ($N_2$) and water ($H_2O$).

DEF is a mixture of purified water and urea. In a typical SCR system, DEF is stored in a tank of a vehicle and is injected into the exhaust. The injected urea breaks down NOx in the exhaust into nitrogen, water, and carbon dioxide. Although various sensors and techniques are available to sense or determine a level of a fluid, such sensors and techniques are not always satisfactory.

One embodiment provides a fluid sensor that includes a guide, a float constrained at least in part by the guide to move along a vertical axis, and a permanent magnet mechanically coupled to the float. The fluid sensor further includes a magnetic angle sensor configured to measure an angle of a magnetic field generated by the permanent magnet and positioned such that movement of the float along the vertical axis varies the angle of the magnetic field generated by the permanent magnet through the magnetic angle sensor.

Another embodiment provides a fluid sensor that includes a tube, a float, a permanent magnet, a spring, and a magnetic angle sensor. In one example, the tube has a vertical axis and is located within a tank configured to hold fluid. The tube includes at least one opening to allow the fluid into the tube. The float is constrained at least in part by the tube and is configured to move along the vertical axis. The permanent magnet is mechanically coupled to the float. The spring has a first end coupled to the tube and a second end coupled to the float. The magnetic angle sensor is configured to measure an angle of a magnetic field generated by the permanent magnet and is positioned such that movement of the float along the vertical axis varies the angle of the magnetic field generated by the permanent magnet through the magnetic angle sensor.

Another embodiment includes a fluid sensor including a tube, a float, a sensing target, a spring, and a sensor. In one example, the tube has a vertical axis and is located within a tank configured to hold fluid. The tube includes at least one opening to allow the fluid into the tube. The float is constrained at least in part by the tube and is configured to move along the vertical axis. The sensing target is mechanically coupled to the float. The spring is configured to expand and contract along the vertical axis. A first end of the spring is coupled to the tube and a second end of the spring is coupled to the float. The sensor is configured to measure a characteristic related to a position of the sensing target and positioned such that movement of the float along the vertical axis varies the measured characteristic. The position of the float is influenced by a volume of the float submerged below a surface of the fluid.

Another embodiment provides a fluid sensor including a cage, a float, a permanent magnet, and a magnetic switch. In one example, the cage is located within a tank configured to hold fluid. The cage includes an opening to allow the fluid into the cage and reduce or eliminate the laminar and turbulence flows within the cage. The float is located within the cage and has a float density that is a predetermined density. The permanent magnet is mechanically coupled to the float. The permanent magnet is configured with a magnetic field that reduces effects of external magnetic fields. The magnetic switch is configured to determine a position of the float within the cage A state of the magnetic switch indicates whether a fluid density of the fluid is less than the predetermined density.

Other aspects of the invention will become apparent by consideration of the detailed description and accompanying drawings.

DETAILED DESCRIPTION

Before any embodiments are explained in detail, it is to be understood that the embodiments are not limited in their application to the details of construction and the arrangement of components set forth in the following description or illustrated in the following drawings. Other embodiments are possible and capable of being practiced or of being carried out in various ways.

Figure 1:
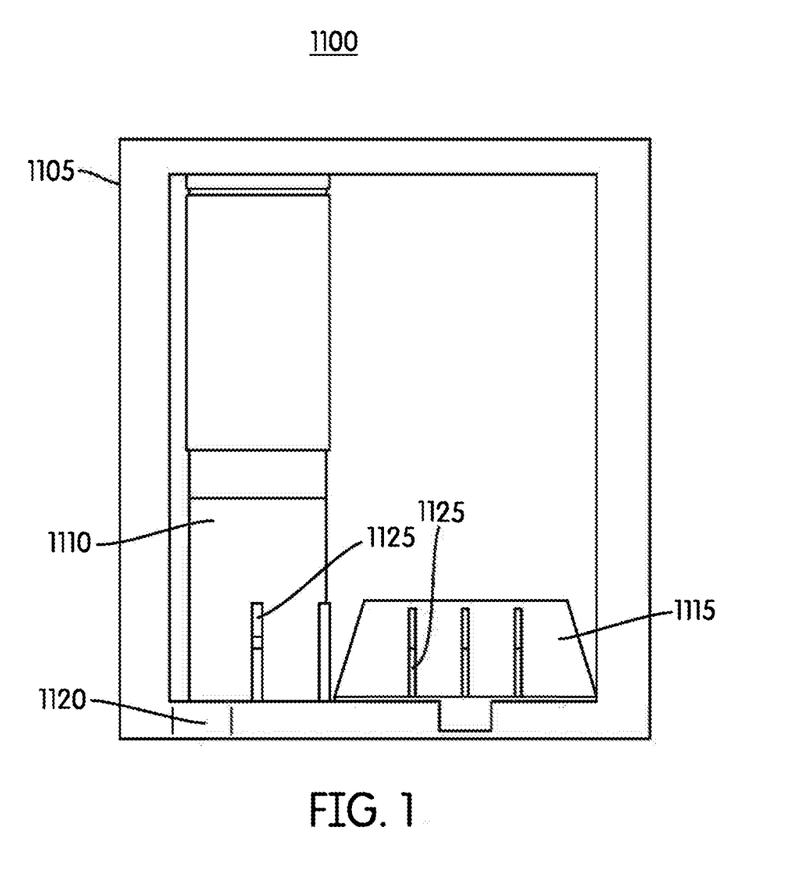
FIG. 1 is a cross-sectional view illustrating a sensing system according to one embodiment.

FIG. 1 illustrates a sensing system 1100 according to some embodiments. In the example illustrated, the sensing system 1100 includes a tank or reservoir 1105 that holds the fluid to be sensed. The fluid may be any fluid, such as an automotive fluid, for example, diesel exhaust fluid (DEF), brake fluid, oil, fuel, transmission fluid, washer fluid, and refrigerant. The sensing system 1100 may include one or more analog or digital sensors. In the example illustrated, the reservoir 1105 includes a fluid level sensor 1110 and a digital fluid density switch 1115. The sensors 1110 and 1115 are coupled to base 1120 which is located at the bottom of the reservoir 1105. The sensors 1110 and 1115 include openings 1125 that allow fluid from the reservoir 1105 to enter the sensors 1110 and 1115. Although FIG. 1 shows a single opening 1125 on the fluid level sensor 1110, in some embodiments, the fluid level sensor 1110 includes additional openings to allow fluid from the reservoir 1105 to enter the fluid level sensor 1110.

Figure 2:
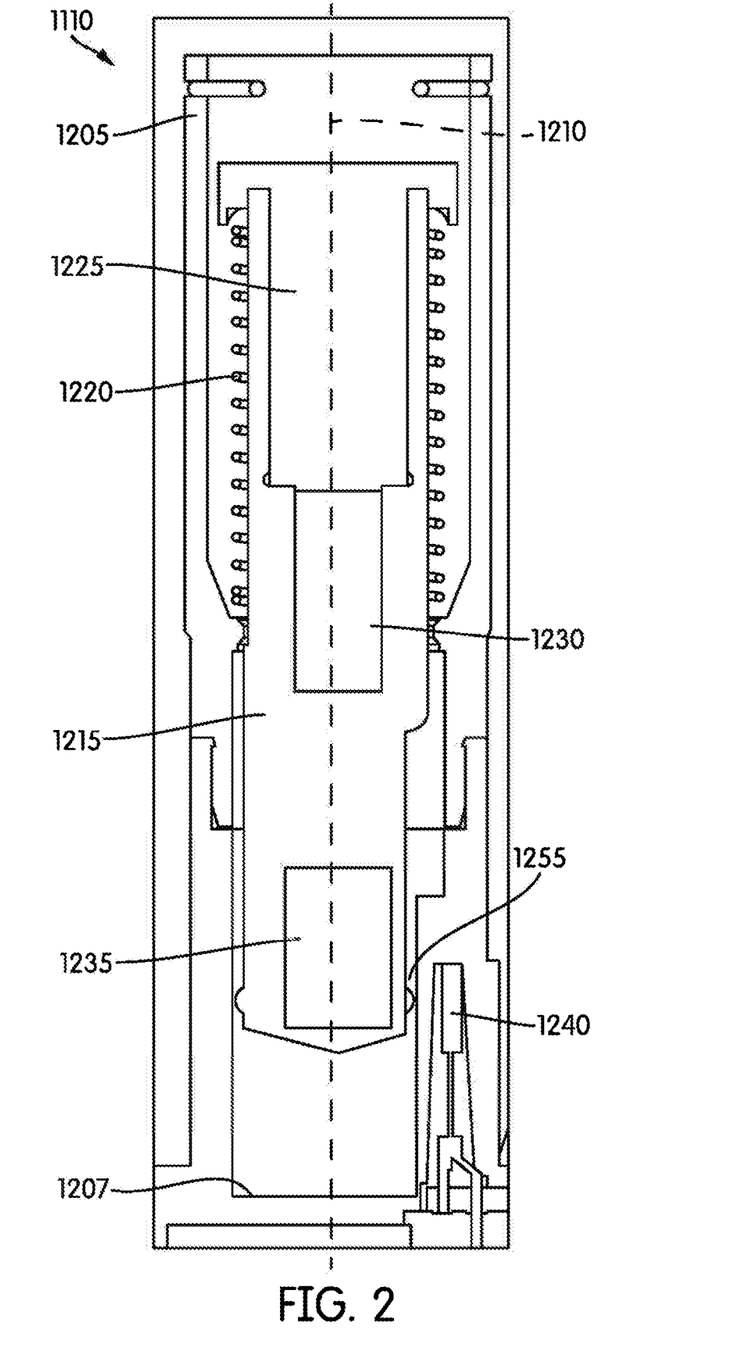
FIG. 2 is a cross-sectional cutaway view illustrating a fluid level sensor of the sensing system of FIG. 1 according to some embodiments.

FIG. 2 illustrates a cross-sectional cutaway view of the fluid level sensor 1110. The fluid level sensor is configured to measure a ratio and/or an actual level of the fluid. In the example shown in FIG. 2, the fluid level sensor 1110 includes a guide in the form of tube 1205 that is oriented vertically, has a bottom 1207, and has a vertical axis 1210. A float 1215 is constrained at least in part (or partially) by the tube 1205 such that the float 1215 is able to move in a predictable manner (for example, along the vertical axis 1210). In one embodiment, the float 1215 is cylindrical in shape. A float with a cylindrical shape is sometimes referred to as a pencil float. The tube 1205 and the float 1215 are merely examples. In some embodiments, the tube 1205 and the float 1215 may be cylindrical, spherical, cubical, or another shape. Furthermore, in some embodiments, the tube 1205 is replaced with a different structural component that constrains the movement of the float 1215 such that the float 1215 moves in a predictable manner. For example a track, rail, or other guide could be used in place of the tube 1205. The float 1215 is movable within the tube 1205 along the vertical axis 1210. In particular, the float 1215 is coupled to a first end of a spring 1220. The first end of the spring 1220 is configured to move along the vertical axis 1210 to expand and compress the spring 1220 relative to a second end of the spring 1220. The second end of the spring 1220 is fixedly coupled to the tube 1205 such that the second end of the spring 1220 is not movable. In some embodiments, the spring 1220 is a coil spring. In some embodiments, the spring 1220 has a lower spring constant along the vertical axis 1210 than it has in a horizontal direction that is perpendicular to the vertical axis 1210. The spring 1220 is made of a material that is compatible with the fluid in the reservoir 1105. For example, when the fluid in the reservoir 1105 is DEF, the spring 1220 may be made of 316L stainless steel. The float 1215 includes a cap 1225, a weight 1230, and a permanent magnet 1235. The permanent magnet 1235 is mechanically coupled to the float 1215. For example, in some embodiments, the permanent magnet 1235 may be located within the float 1215 or may be attached to an outside surface of the float 1215. In some embodiments, the float 1215 has a density that is higher than the density of the fluid in the reservoir 1105 such that the float 1215 would sink to the bottom 1207 of the tube 1205 if the spring 1220 were not holding it up (or applying a counteracting force). Additionally, the tube 1205 includes a magnetic angle sensor 1240 located proximate the permanent magnet 1235. In some embodiments, the spring 1220 allows the float 1215 to move substantially less than change in a level of the fluid. For example, in some embodiments, when the level of the fluid changes approximately 10 mm, the float 1215 may only move approximately 1 mm. In some embodiments, the magnetic angle sensor 1240 is an analog sensor configured to dynamically measure a magnetic field angle and output the measured magnetic field angle in real-time. In other embodiments, the magnetic angle sensor 1240 may be a digital sensor configured to detect when a magnetic field crosses a magnetic field threshold. In such an embodiment, the magnetic angle sensor 1240 outputs data once the magnetic field threshold has been crossed.

Figure 3A:
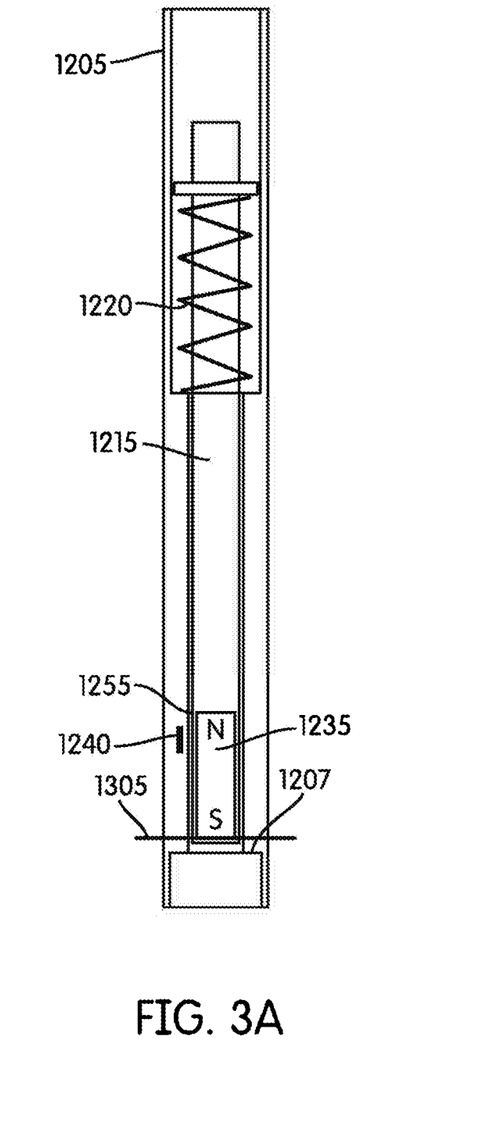
FIGS. 3A-3B illustrate a fluid level sensor of the sensing system of FIG. 1 according to some embodiments.
Figure 3B:
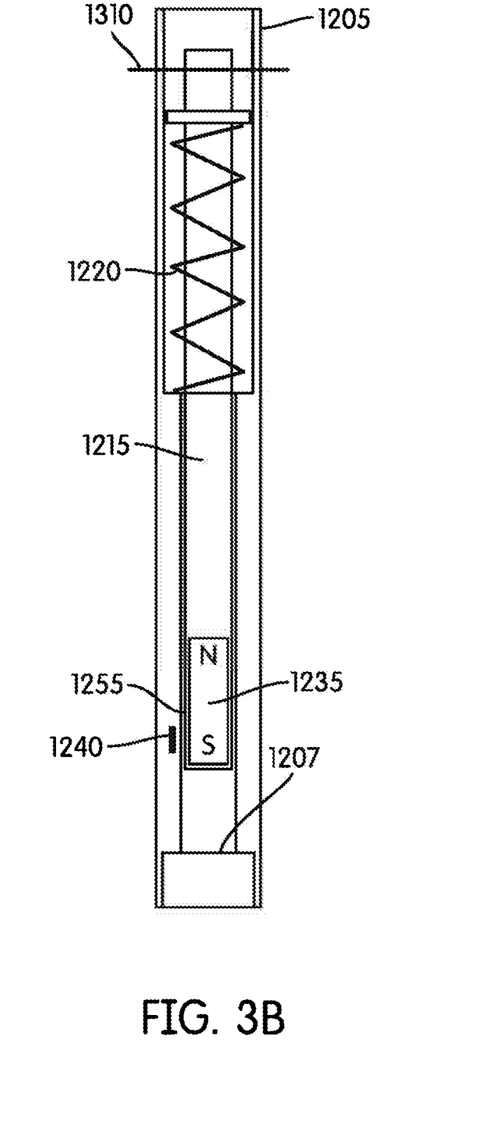

FIGS. 3A and 3B illustrate simplified schematic views of the fluid level sensor 1110 in two exemplary situations. FIG. 3A illustrates the fluid level sensor 1110 when a fluid level 1305 is near the bottom of the reservoir 1105. Conversely, FIG. 3B illustrates the fluid level sensor 1110 when a fluid level 1310 is near the top of the reservoir 1105. The fluid level sensor 1110 provides an approximately linear non-contact method of measurement of the fluid level in the reservoir 1105. More specifically, when the fluid level of the reservoir 1105 changes, it causes a change in buoyancy force exerted on the spring 1220 by the float 1215, which causes the float 1215 to move along the vertical axis 1210. The movement of the float 1215 can be determined by monitoring an angle of a magnetic field produced by the permanent magnet 1235 through the magnetic angle sensor 1240. Based on the angle of the magnetic field through the magnetic angle sensor 1240, the fluid level of the reservoir 1105 can be calculated.

The combination of buoyancy force and spring force on the float 1215 can be viewed as corresponding to the weight of the float 1215. Mathematically, this may be expressed as: mg=kx+ρgV (Eqn. 10), where m is the mass of the float 1215, g is the acceleration of gravity, k is the spring constant of the spring 1220, ρ is the density of the fluid in the reservoir 1105, V is the volume of the float 1215 under the surface of the fluid in the reservoir 1105 (that is, the cross-sectional area of the float 1215 times the level of the fluid in the reservoir 1105 on the float 1215), and x is the distance that the spring is compressed from its uncompressed length. Solving Eqn. 10 for x leads to Eqn. 11:

$$x = \frac{mg}{k} - \frac{\rho g * \text{Area} * \text{Level}}{k}.$$

By try Taxing the derivative of Eqn. 11 with respect to the level of the fluid in the reservoir 1105 on the float 1215, it can be seen that the position of the float 1215 moves linearly with the level of the fluid in the reservoir 1105 on the float 1215:

$$\frac{dx}{d(\text{Level})} = -\frac{\rho g * \text{Area}}{k}. \quad \text{(Eqn. 12)}$$

The length of the permanent magnet 1235 and the location of the magnetic angle sensor 1240 may be chosen such that the angle of the magnetic field produced by the permanent magnet 1235 through the magnetic angle sensor 1240 changes approximately linearly with the position of the float 1215. For example, such a relationship occurs when a) the magnetic angle sensor 1240 is positioned such that it is halfway between a top point and a bottom point that define the maximum distance the float 1215 can travel, and b) the length of the permanent magnet 1235 is twice the distance that the float 1215 may travel. To configure the fluid level sensor 1110 in this manner, the desired spring constant k of the spring 1220 can be calculated as follows:

$$k = \frac{\text{Buoyancy force}}{\text{Desired distance of pencil float travel}}, \quad \text{(Eqn. 13)}$$

where buoyancy force is the total buoyancy force on the float 1215 when the fluid in the reservoir 1105 is above the float 1215 and the desired distance of travel is half of the length of the permanent magnet 1235. The magnetic angle sensor 1240 can then be positioned so that it is halfway in between a position of the float 1215 indicating a full reservoir 1105 and a position of the float 1215 indicating an empty reservoir 1105.

In addition to providing approximately linear measurement changes as the fluid level in the reservoir 1105 changes, the fluid level sensor 1110 as described above is largely independent of relative position shifts in the horizontal plane. For example, small changes in a gap 1255 between the permanent magnet 1235 and the magnetic angle sensor 1240 create only minor changes to the measured magnetic field angle. Similarly, small changes in cross-axis alignment between the permanent magnet 1235 and the magnetic angle sensor 1240 create only minor changes to the measured magnetic field angle.

Figure 4:
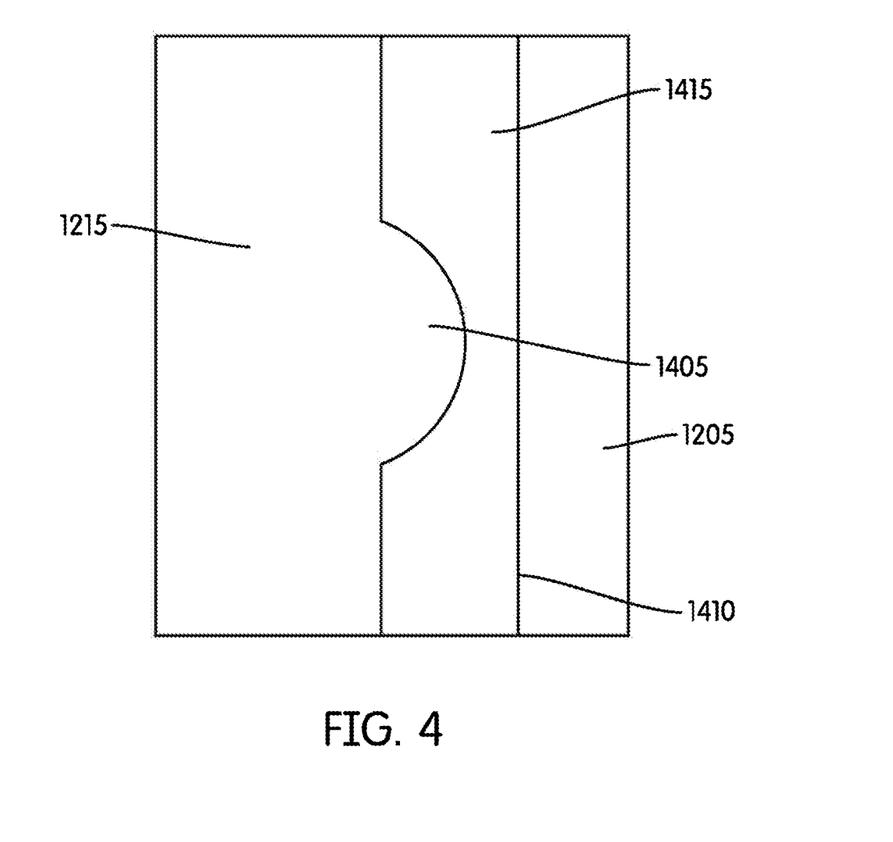
FIG. 4 is an enlarged view of a tube and float of the fluid level sensor of FIG. 2 according to some embodiments.

FIG. 4 illustrates an enlarged view of the tube 1205 and the float 1215. In some embodiments, the tube 1205 or the float 1215 includes a convex contact surface 1405 to reduce friction between the tube 1205 and the float 1215. The other of the tube 1205 or the float 1215 has a smooth surface 1410. FIG. 4 shows the float 1215 with the convex contact surface 1405 and the tube 1205 with the smooth surface 1410. The surfaces 1405 and 1410 allow contaminant particles to sink past the contact points between the tube 1205 and the float 1215 to reduce friction. Additionally, friction between the tube 1205 and the float 1215 may be reduced by using materials for the tube 1205 and the float 1215 that have low coefficients of friction. For example, many plastics may be used to make the tube 1205 and/or the float 1215. It should be understood that materials used to make the float 1215 may also have low absorption characteristics to prevent the float 1215 from absorbing fluid 1415 of the reservoir 1105, which may change the mass and/or volume of the float 1215.

In some embodiments, the temperature of the environment in which the fluid level sensor 1110 is used may affect the measurement of the fluid level within the reservoir 1105. For example, the temperature may affect the elasticity of the spring 1220 (that is, the value of the spring constant k). Additionally, the temperature may cause thermal expansion of the tube 1205 and/or the float 1215 that may change the absolute length of the tube 1205 and/or the float 1215. Such variations in the fluid level sensor 1110 due to temperature are predictable and may be corrected, for example, as follows: Temperature Correction=(t−25)*(C1−Measured Fluid Level)*C2 (Eqn. 14), where t is the measured temperature, C1 and C2 are constants, and Measured Fluid Level is the measured fluid level without temperature correction. The temperature correction value may then be used to calculate the actual fluid level within the reservoir 1105 as follows: Actual Fluid Level=Measured Fluid Level+Temperature Correction (Eqn. 15). It should be understood that constants C1 and C2 are calibrated through testing such that the actual fluid level is approximately equal to the sum of the measured fluid level and the temperature correction.

In some embodiments, the magnetic angle sensor 1240 is part of an integrated circuit that senses the temperature of the fluid as well as the angle of the magnetic field. For example, the magnetic angle sensor 1240 may make both such measurements and communicate these measurements to an electronic processor using digital messages (for example, using Single-Edge Nibble Transmission protocol). In some embodiments, other communication protocols, such as Peripheral Sensor Interface 5 (PSI5), inter-integrated circuit (I2C), and the like, may be used to communicate the magnetic field angle measurement and the temperature measurement on a single communications interface to an electronic processor. Using a single device (for example, the magnetic angle sensor 1240) to measure and transmit both magnetic field angle measurements and the temperature measurements reduces the complexity and cost of the fluid level sensor 1110.

In some embodiments, the fluid level sensor 1110 filters fluid level measurements to prevent vertical accelerations experienced during vehicle motion from causing incorrect fluid level measurements. For example, in some embodiments, measurements from the magnetic angle sensor 1240 are passed through a low pass filter to filter away measurement oscillations caused by vertical acceleration. Additionally, often times fluid level sensing applications do not require measurement updates very frequently (for example, every second). Accordingly, in some embodiments, digital filtering is used to calculate an average value of the fluid level over a predetermined period of time (for example, simple moving averages and/or weighted moving averages) to reduce or eliminate the effect of vertical accelerations on the measured value of the fluid level in the reservoir 1105.

Additionally or alternatively, in some embodiments, the fluid level sensor 1110 dampens oscillations of the float 1215 to prevent vertical accelerations experienced during vehicle motion from causing incorrect fluid level measurements. For example, in some embodiments, the tube 1205 includes a pocket below the bottom of the float 1215 that fills with fluid and has a restricted escape path for the fluid when the float 1215 moves down into the pocket. When the gaps between the float 1215 and the pocket are small, damping that reduces the tendency of the float 1215 to move due to vertical accelerations will occur. Additionally or alternatively, in some embodiments, relative motion between permanent magnets and conductors induce Eddy currents that create a drag on the movement of the float 1215 (that is, magnetic damping). Furthermore, in some embodiments, the motion of the float 1215 may be used to drive part of the float 1215 into contact with the tube 1205, which produces friction. The friction between the float 1215 and the tube 1205 may dampen the motion of the float 1215 (that is, resistive damping). Both magnetic damping and resistive damping rely on the velocity of the tube 1205 to create forces that oppose undesired movement of the float 1215 while avoiding the creation of hysteresis in the measurement of the fluid level.

Figure 5A:
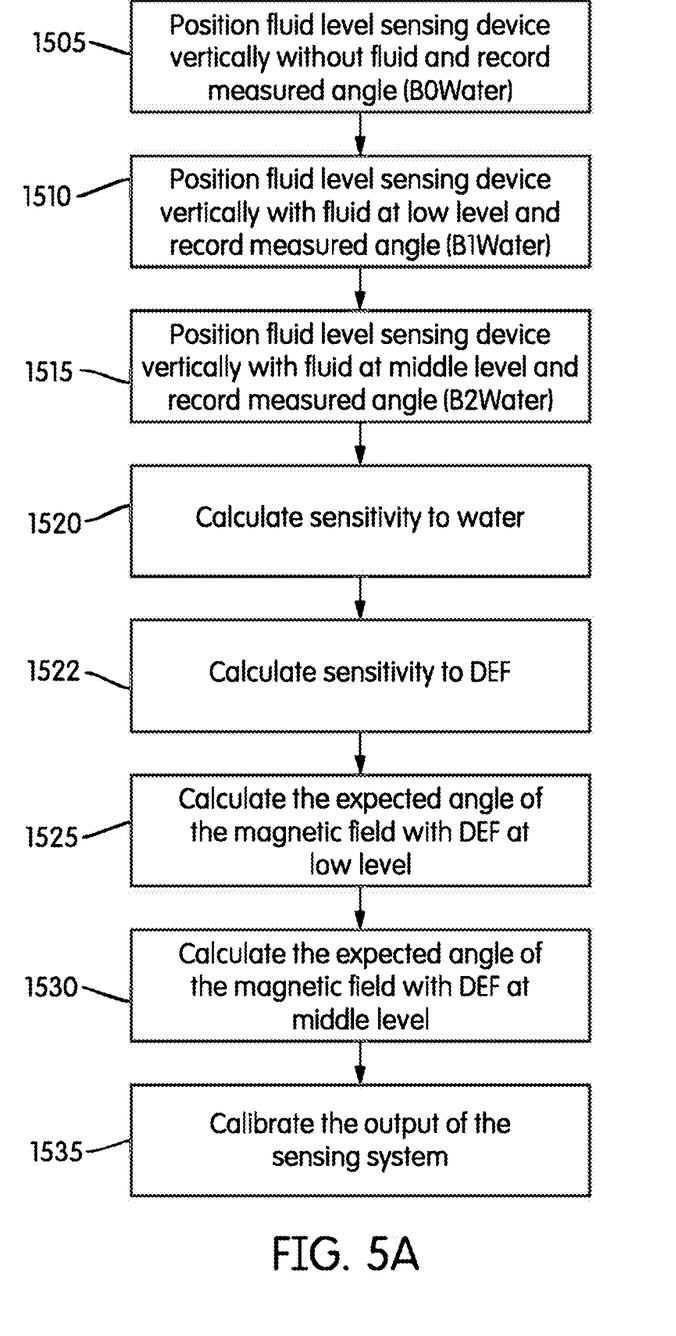
FIG. 5A is a flowchart illustrating an operation, or process, of the sensing system of FIG. 1 according to some embodiments.

FIG. 5A illustrates one exemplary method 1500 of calibrating the fluid level sensor 1110 by performing fluid level measurements at three different fluid levels. In the embodiment illustrated, the fluid level sensor 1110 is positioned vertically without fluid such that there is no buoyancy force pushing up on the float 1215 (block 1505). The magnetic field angle produced by the permanent magnet 1235, as measured at the magnetic angle sensor 1240, is recorded. This magnetic field angle is referred to as B0 and the corresponding fluid level is referred to as Level0. The fluid level sensor 1110 is filled with a low level of water (for example, fifteen millimeters) that provides some buoyancy force that pushes up the float 1215 from the bottom of the reservoir 1105 (block 1510). The magnetic field angle produced by the permanent magnet 1235 with the water level at the low level, as measured at the magnetic angle sensor 1240 is recorded. This magnetic field angle is referred to as B1Water and the corresponding fluid level is referred to as Level1. The fluid level sensor 1110 is filled with a high level of water (for example, ninety millimeters) that is approximately in the high end of the total range of measurable fluid in the reservoir 1105 (block 1515). The magnetic field angle produced by the permanent magnet 1235 with the water level at the middle level, as measured at the magnetic angle sensor 1240 is recorded. This magnetic field angle is referred to as B2Water and the corresponding fluid level is referred to as Level2.

At block 1520, the sensitivity to water of the fluid level sensor 1110 is calculated using, for example, the following equations.

$$\text{Sensitivity to water} = \frac{B1Water - B2Water}{Level1 - Level2}. \quad \text{(Eqn. 16)}$$

$$Level0 = Level1 - \frac{B1Water - B0Water}{\text{Sensitivity to water}}. \quad \text{(Eqn. 17)}$$

The sensitivity to water of the fluid level sensor 1110 is, in one embodiment, the measurement change per unit of fluid height change when water is the fluid in the reservoir 1105. The sensitivity of the fluid level sensor 1110 is different for water and DEF because the density of the fluids are different. In one example, the buoyancy force of a fluid on a submerged object may be calculated as follows: Buoyancy force=Density of fluid*Volume Submerged*Gravity (Eqn. 18). Accordingly, at block 1522, the sensitivity to DEF of the fluid level sensor 1110 is calculated as follows: Sensitivity to $$DEF = \frac{\rho DEF}{\rho Water} * \text{Sensitivity to water},$$

where $\rho DEF$ is the density of DEF and $\rho Water$ is the density of water (Eqn. 19).

Next, the angle of the magnetic field expected to be produced when DEF is at a fluid level of Level1 (that is, a low fluid level), which is referred to as B1DEF, is calculated (block 1525). In one example, the angle of the magnetic field is calculated as follows: B1DEF=B0+Sensitivity to DEF*(Level1−Level0) (Eqn. 20). Similarly, the angle of the magnetic field expected to be produced when DEF is at a fluid level of Level2 (that is, a middle fluid level), which is referred to as B2DEF, is calculated (block 1530). In one example, the B2DEF is calculated as follows: B2DEF=B0+Sensitivity to DEF*(Level2−Level0) (Eqn. 21). The output of the fluid level sensor 1110 is then calibrated such that the output corresponds to the fluid level of the fluid in the reservoir 1105 (block 1535). For example, the output of the fluid level sensor 1110 may be one hundred and fifty counts when the angle of the magnetic field through the magnetic angle sensor 1240 indicates that the fluid level of the DEF is at Level1 (that is, fifteen millimeters). Similarly, the output of the fluid level sensor 1110 may be four hundred and fifty counts when the angle of the magnetic field through the magnetic angle sensor 1240 indicates that the fluid level of the DEF is at Level2 (that is, ninety millimeters). The output of the fluid level sensor 1110 is approximately linear between these fluid levels and beyond these fluid levels to the maximum measurement level of the fluid level sensor 1110.

It should be understood that the calibration method 1500 described above assumes that water is used to calibrate the fluid level sensor 1110 and that the float 1215 and the water are at approximately the same temperature.

Figure 5B:
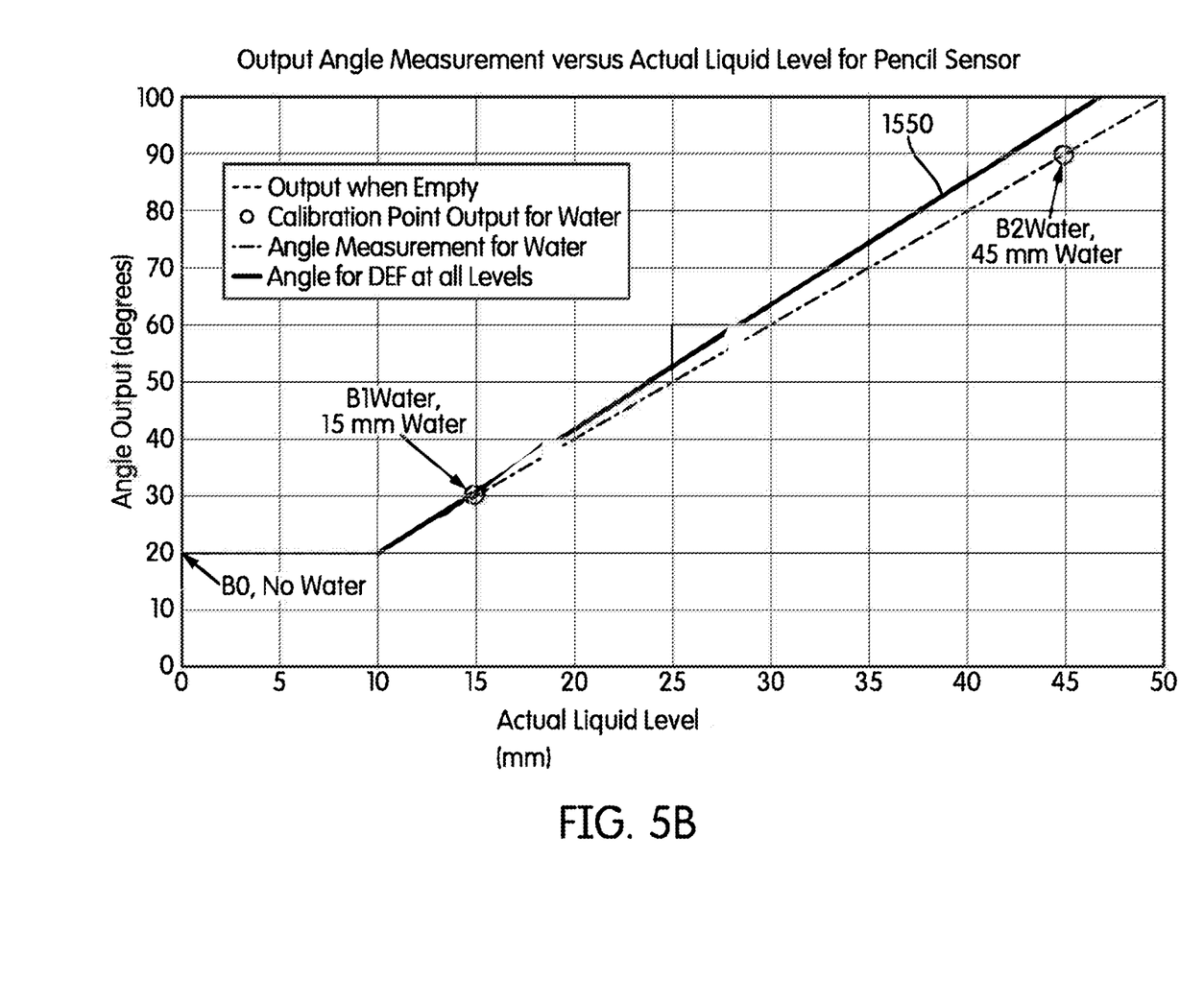
FIG. 5B is a graph illustrating an angle output versus an actual liquid level according to some embodiments.

FIG. 5B illustrates the results of the calibration method 1500. As indicated by FIG. 5B, the fluid level sensor 1110 does not start measuring the fluid level until the fluid level reaches approximately ten millimeters. FIG. 5B shows calibration points corresponding to Level1 and Level2 as well as an expected measurement line 1550 for when DEF is the fluid in the reservoir 1105. It should be understood that the expected measurement line 1550 may also be calculated for other types of fluids by using the density of the other type of fluid in place of the density of DEF in the equations (for example, Equation 19) shown throughout the method 1500 of FIG. 5A.

Figure 6:
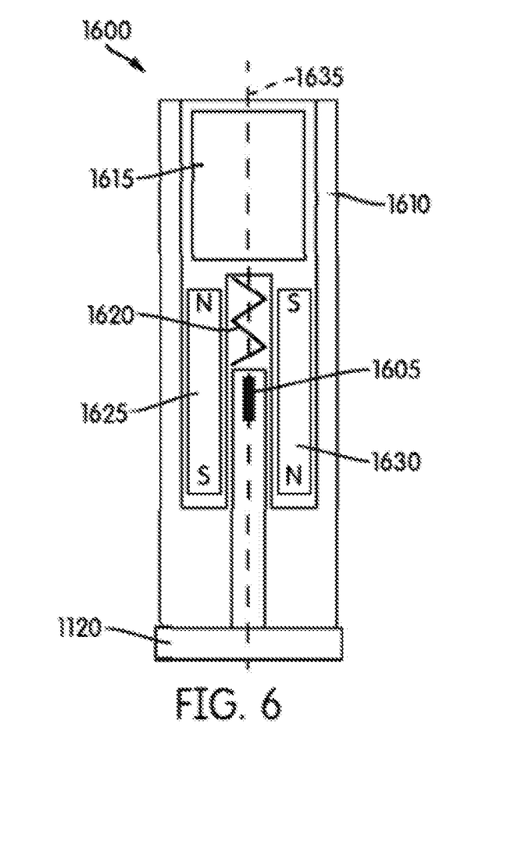
FIG. 6 is a schematic drawing illustrating a fluid level sensor according to another embodiment.

FIG. 6 illustrates a schematic diagram of an alternative embodiment of a fluid level sensor 1600 with a magnetic flux density sensor 1605. As shown in FIG. 6, the fluid level sensor 1600 includes a tube 1610, a float 1615 coupled to a spring 1620, and two permanent magnets 1625 and 1630. With the exception of the magnetic flux density sensor 1605, the fluid level sensor 1600 operates similarly to the fluid level sensor 1110 described above. In particular, the tube 1610 has a vertical axis 1635 and houses the float 1615 that is movable along the vertical axis 1635. The float 1615 is coupled to a first end of the spring 1620. A second end of the spring 1620 is fixedly coupled to the tube 1610. In the example shown in FIG. 6, the tube 1610 is arc-shaped to allow the magnetic flux density sensor 1605 to protrude upwards from the base of the tube 1610. Similarly, the float 1615 is arc-shaped such that the two permanent magnets 1625 and 1630 can move along the vertical axis 1635 and pass along the sides of the magnetic flux density sensor 1605. The permanent magnets 1625 and 1630 are mechanically coupled to the float 1615. For example, in some embodiments, the permanent magnets 1625 and 1630 may be located within the float 1615 or may be attached to an outside surface of the float 1615.

The magnetic flux density sensor 1605 senses the magnetic flux density of the magnetic field between the two permanent magnets 1625 and 1630, which is dependent on the buoyancy force provided by the fluid in the reservoir 1105 as explained above. For example, when the fluid level is relatively high, the buoyant force on the float 1615 will force the float 1615 upward such that a magnetic field through the magnetic flux density sensor 1605 is directed from a north pole of the permanent magnet 1630 to a south pole of the permanent magnet 1625. Conversely, when the fluid level is relatively low, the buoyant force on the float 1615 will be less, which allows the float 1615 to compress the spring 1620. Accordingly, the magnetic field through the magnetic flux density sensor 1605 is directed from a north pole of the permanent magnet 1625 to the south pole of the permanent magnet 1630 (that is, the magnetic field is in the opposite direction when the fluid level is relatively low than when the fluid level is relatively high). By measuring the magnitude and/or direction of the magnetic field through the magnetic flux density sensor 1605, the fluid level of the fluid in the reservoir 1105 can be calculated using the equations as explained above with respect to the fluid level sensor 1110.

In alternate embodiments, the position of the float 1215, 1615 may be measured using inductive sensing principals. In this case, a conducting or ferrous target (that is, a sensing target) takes the place of the permanent magnet(s) 1235, 1625, and 1630 in the float 1215, 1615. For example, at least one coil may be used instead of the magnetic angle sensor 1240 or the magnetic flux density sensor 1605. In some embodiments, the coil may be driven with a high frequency signal and the impedance characteristics of the coil are measured. As the float 1215, 1615 (in particular, the conducting or ferrous target within the float 1215, 1615) moves across the face of the coil, the impedance characteristics of the coil change, which may be used to measure the position of the float 1215, 1615. In some embodiments, a transmitter coil is driven with a high frequency signal and two separate receiver coils are used to measure the signal coupled from the transmitter coil to the receiver coils. In such embodiments, the position of the float 1215, 1615 (in particular, the conducting or ferrous target within the float 1215, 1615) changes the ratio of the signal at the at the two receiver coils. Accordingly, the position of the float 1215, 1615 may be measured.

As mentioned above, the reservoir 1105 also includes the digital fluid density switch 1115 as shown in FIG. 1. The digital fluid density switch 1115 measures the density of the fluid in the reservoir 1105 and may determine whether the correct type of fluid is in the reservoir 1105. For example, the digital fluid density switch 1115 may identify when the urea concentration of DEF is adequate for an effective selective catalytic reduction process. In particular, the density of DEF is dependent on the concentration of urea in the DEF. Accordingly, it is possible to identify low urea concentrations in the DEF by measuring the density of the DEF using the digital fluid density switch 1115.

Figure 7A:
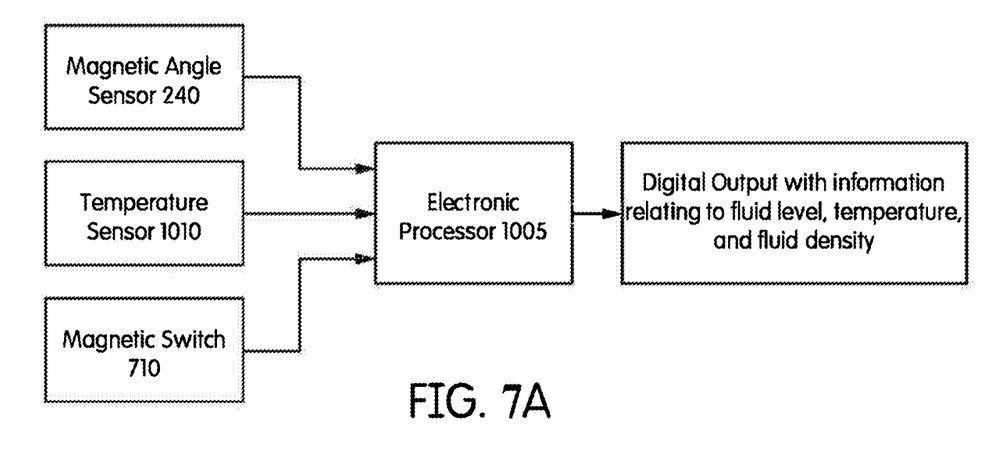
FIG. 7A is a block diagram illustrating a control system of the sensing system of FIG. 1 according to some embodiments.

Using the fluid level sensor 1110 and the digital fluid density switch 1115, the fluid level, temperature, and fluid density of the fluid in the reservoir 1105 may be determined. In particular, output signals from a sensor associated with each characteristic may be transmitted to a processing unit, or an electronic processor, 1005 as shown in FIG. 7A. Also as shown in FIG. 7A, in some embodiments, the reservoir 1105 may include a separate temperature sensor 1010 to sense the temperature of the fluid. After receiving signals from the magnetic angle sensor 1240, the magnetic switch 1710, and the temperature sensor 1010, the electronic processor 1005 may then transmit a digital output that includes information related to fluid level, temperature, and fluid density. For example, the electronic processor 1005 may connect to a DEF fluid level indicator in a vehicle to indicate the amount of DEF in the reservoir 1105. Additionally, the electronic processor 1005 may connect to a DEF quality indicator to indicate whether the density of the DEF in the reservoir 1105 is adequate as explained above. Furthermore, in some embodiments, the electronic processor 1005 may communicate the information related to fluid level, temperature, and fluid density to another electronic control unit at another location.

Figure 7B:
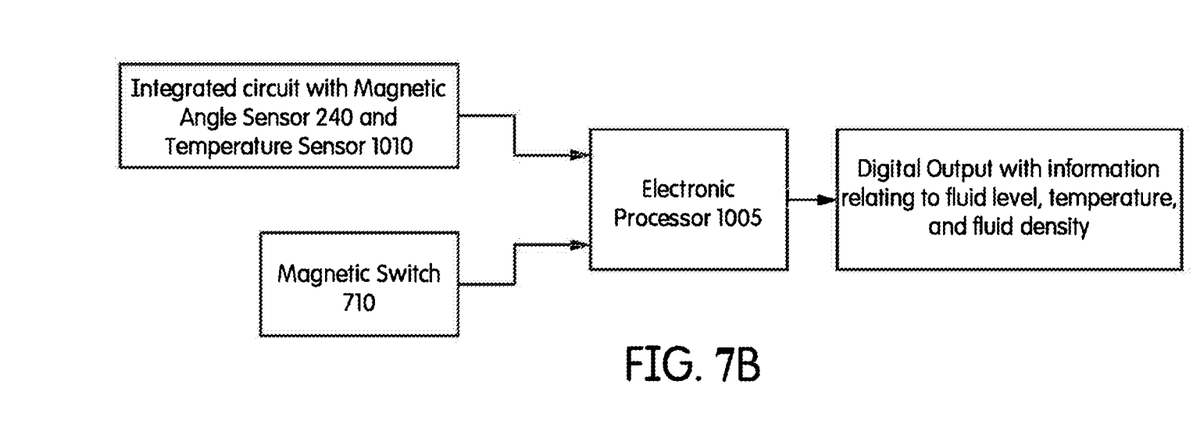
FIG. 7B is a block diagram illustrating a control system of the sensing system of FIG. 1 according to another embodiment.

As shown in FIG. 7B, in some embodiments, the magnetic angle sensor 1240 may be an integrated circuit that includes a temperature sensor 1010. As mentioned above, both the magnetic field angle measurement and the temperature measurement may be communicated on a single communications interface to the electronic processor 1005. In the embodiment shown in FIG. 7B, the magnetic switch 710 of the digital fluid density switch 1115 may separately transmit an output signal to the electronic processor 1005. As explained above, after receiving output signals from the sensors/switch 240, 1010 and 710, the electronic processor 1005 may then transmit a digital output that includes information related to fluid level, temperature, and fluid density.

Figure 7C:
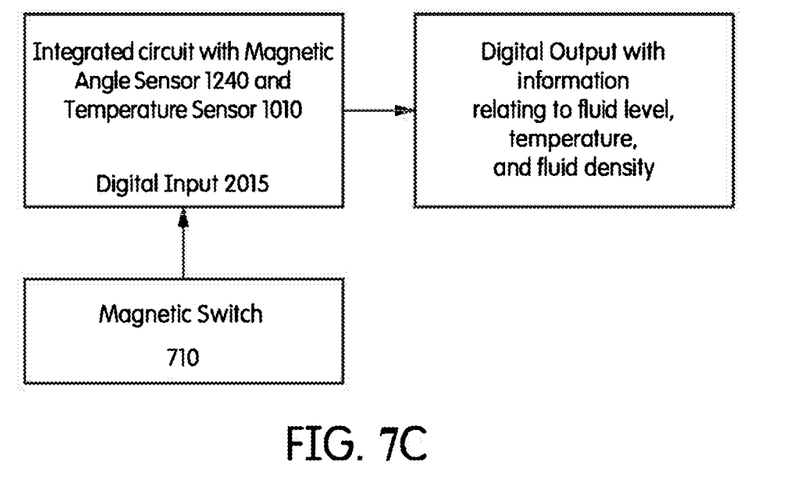
FIG. 7C is a block diagram illustrating a control system of the sensing system of FIG. 1 according to another embodiment.

As shown in FIG. 7C, in some embodiments, when the magnetic angle sensor 240 is an integrated circuit that includes the temperature sensor 1010, the magnetic angle sensor 240 may further include a digital input 1015 coupled to the magnetic switch 710. For example, the output signal from the magnetic switch 1710 of the digital fluid density switch 1115 may be monitored by the integrated circuit of the magnetic angle sensor 240. Accordingly, the output signal of the magnetic angle sensor 240 may include information relating to fluid level, temperature, and fluid density. Such a configuration may reduce complexity and cost of the fluid level sensor 1110 and the digital fluid density switch 1115 by allowing the outputs of numerous sensors to be transmitted on a single communications interface without the use of the electronic processor 1005. It should be understood that the block diagrams shown in FIGS. 7A-7C are merely exemplary and that other configurations of the sensors 240, 710, and 1010 and the electronic processor 1005 may be used.

Thus, the invention provides, among other things, a sensing system configured to sense a level of a fluid. Various features and advantages of the invention are set forth in the following claims.

What is claimed is:

1. A fluid sensor comprising:
   a float constrained to move along a vertical axis;
   a permanent magnet mechanically coupled to the float;
   a temperature sensor configured to measure a temperature of a fluid;
   a magnetic angle sensor configured to measure an angle of a magnetic field generated by the permanent magnet and positioned such that movement of the float along the vertical axis varies the angle of the magnetic field generated by the permanent magnet through the magnetic angle sensor; and
   a controller having an electronic processor, the controller configured to
      receive, via the magnetic angle sensor, the angle of the magnetic field;
      receive, via the temperature sensor, the temperature of the fluid; and
      determine, based on the angle of the magnetic field and the temperature of the fluid, a level of the fluid.

2. The fluid sensor of claim 1, further comprising a guide and wherein the float is at least partially constrained by the guide.

3. The fluid sensor of claim 2, wherein the guide has a cylindrical shaped and is oriented vertically.

4. The fluid sensor of claim 3, further comprising a spring having a first end and a second end, wherein the float is coupled to the first end of the spring.

5. The fluid sensor of claim 1, wherein the magnetic angle sensor is a sensor with an analog output.

6. The fluid sensor of claim 1, wherein the magnetic angle sensor is a sensor with a digital output.

7. The fluid sensor of claim 1, wherein the float includes a convex contact surface.

8. A fluid sensor comprising:
   a tube having a vertical axis and located within a tank configured to hold fluid, wherein the tube includes at least one opening to allow the fluid into the tube;
   a float constrained at least in part by the tube and configured to move along the vertical axis;
   a permanent magnet mechanically coupled to the float;
   a spring having a first end coupled to the tube and a second end coupled to the float;
   a temperature sensor configured to measure a temperature of a fluid;
   a magnetic angle sensor configured to measure an angle of a magnetic field generated by the permanent magnet and positioned such that movement of the float along the vertical axis varies the angle of the magnetic field generated by the permanent magnet through the magnetic angle sensor; and a controller having an electronic processor, the controller configured to
- receive, via the magnetic angle sensor, the angle of the magnetic field;
- receive, via the temperature sensor, the temperature of the fluid; and
- determine, based on the angle of the magnetic field and the temperature of the fluid, a level of the fluid.

9. The fluid sensor of claim 8, wherein a maximum distance the float can travel along the vertical axis is approximately half of a length of the permanent magnet along the vertical axis.

10. The fluid sensor of claim 9, wherein the magnetic angle sensor is positioned halfway between a top point and a bottom point that define the maximum distance the float can travel.

11. The fluid sensor of claim 8, wherein the magnetic angle sensor is a sensor with an analog output.

12. The fluid sensor of claim 8, wherein the magnetic angle sensor is a sensor with a digital output.

13. The fluid sensor of claim 8, wherein the float includes a convex contact surface.

14. The fluid sensor of claim 8, wherein the tube further includes a pocket situated below the float.

15. A fluid sensor comprising:
- a tube having a vertical axis and located within a tank configured to hold fluid, wherein the tube includes at least one opening to allow the fluid into the tube;
- a float constrained at least in part by the tube and configured to move along the vertical axis;
- a sensing target mechanically coupled to the float;
- a spring configured to expand and contract along the vertical axis, wherein a first end of the spring is coupled to the tube and a second end of the spring is coupled to the float;
- a temperature sensor configured to measure a temperature of the fluid;
- a coil configured to measure a characteristic related to a position of the sensing target and positioned such that movement of the float along the vertical axis varies the measured characteristic, wherein the position of the float is influenced by a volume of the float submerged below a surface of the fluid; and
- a controller having an electronic processor, the controller configured to
  - receive, via the temperature sensor, the temperature of the fluid;
  - determine an impedance of the coil; and
  - determine, based on the temperature of the fluid and the impedance of the coil, a level of the fluid.

16. The fluid sensor of claim 15, wherein the spring allows a movement of the float along the vertical axis to be less than a change of the level of the fluid.

17. The fluid sensor of claim 15, wherein the float includes a convex contact surface.

18. The fluid sensor of claim 15, wherein the tube further includes a pocket situated below the float.

* * * * *